United States Patent
Ezumi et al.

[11] Patent Number: 5,815,288
[45] Date of Patent: Sep. 29, 1998

[54] FACSIMILE APPARATUS WITH CHANGEABLE TRANSMISSION ENERGY LEVEL AND TRANSMISSION SPEED

[75] Inventors: Yosuke Ezumi; Toshio Kenmochi; Hisashi Toyoda, all of Yokohama; Takeshi Tsukamoto, Kawasaki, all of Japan

[73] Assignee: Canon Kabushiki Kaisha, Japan

[21] Appl. No.: 847,241

[22] Filed: May 1, 1997

Related U.S. Application Data

[63] Continuation of Ser. No. 91,600, Jul. 15, 1993, abandoned.

[30] Foreign Application Priority Data

Jul. 17, 1992 [JP] Japan .................................. 4-190945

[51] Int. Cl.$^6$ .............................. H04N 1/36; H04N 1/32; H04M 11/00
[52] U.S. Cl. ........................ 358/468; 358/409; 358/412; 358/442; 379/93.33; 379/93.34; 379/100.15
[58] Field of Search ..................................... 358/400, 406, 358/409, 412, 420, 421, 468, 486, 442, 469; 379/100, 100.12, 100.15, 93.32, 93.33, 93.34; 375/257

[56] References Cited

U.S. PATENT DOCUMENTS

| | | | |
|---|---|---|---|
| 4,215,343 | 7/1980 | Maxwell | 379/93.34 |
| 4,236,248 | 11/1980 | Teramura et al. | 375/121 |
| 4,694,490 | 9/1987 | Harvey et al. | 358/142 |
| 4,891,836 | 1/1990 | Takahashi | 379/100 |
| 4,932,048 | 6/1990 | Kermochi et al. | 379/100 |
| 5,199,071 | 3/1993 | Abe et al. | 379/93.34 |
| 5,200,991 | 4/1993 | Motoyanagi | 379/100 |
| 5,282,054 | 1/1994 | Oang et al. | 358/406 |
| 5,351,134 | 9/1994 | Yaguchi et al. | 358/405 |
| 5,537,220 | 7/1996 | Ezumi et al. | 379/93.34 |

FOREIGN PATENT DOCUMENTS

| | | |
|---|---|---|
| 2100524 | 4/1990 | Japan . |
| 4355537 | 12/1992 | Japan . |

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

A facsimile apparatus comprises a communication unit for conducting data communication through a public line, and a changing unit for changing a transmission level of a signal transmitted by the communication unit to the line.

26 Claims, 13 Drawing Sheets

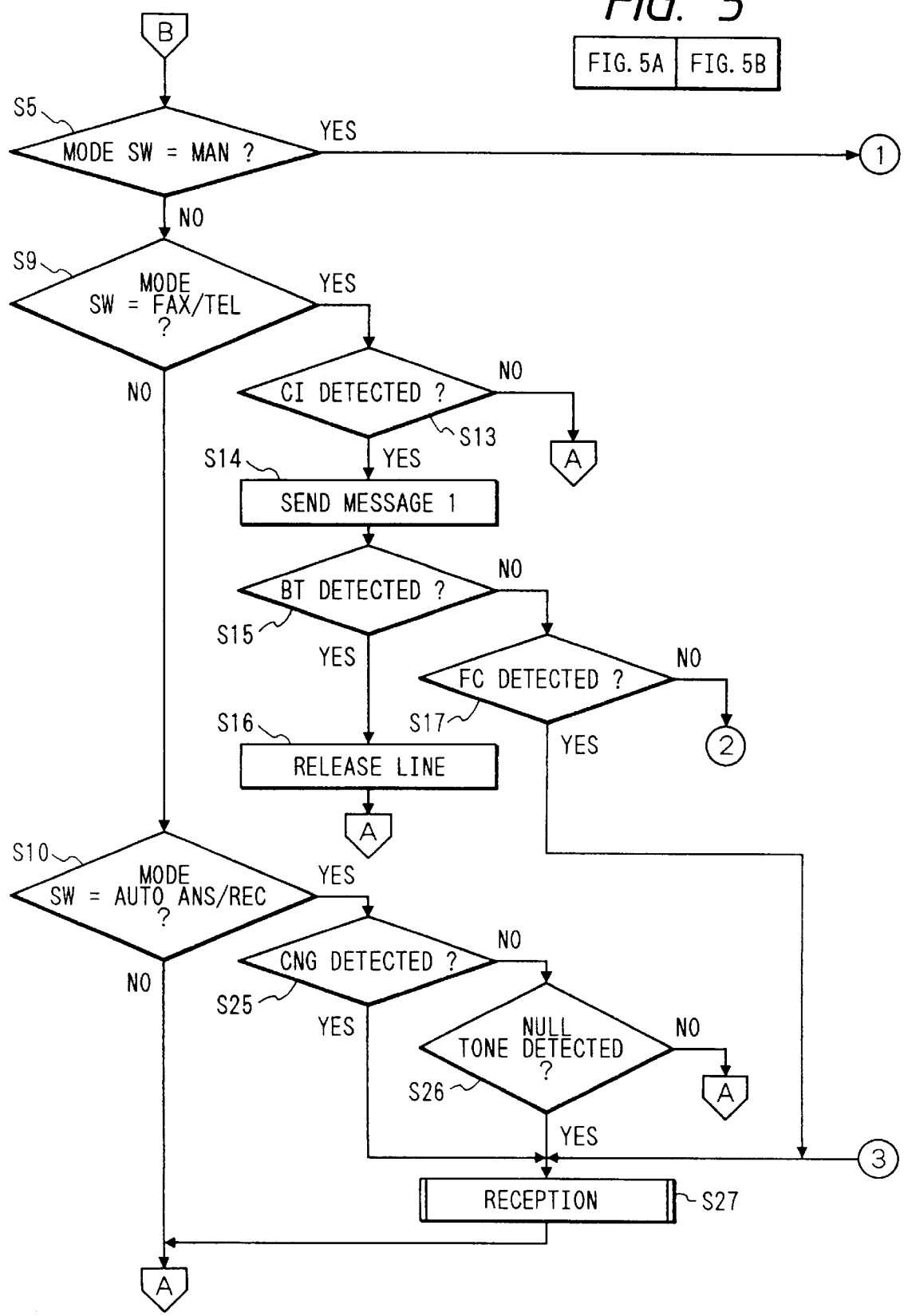

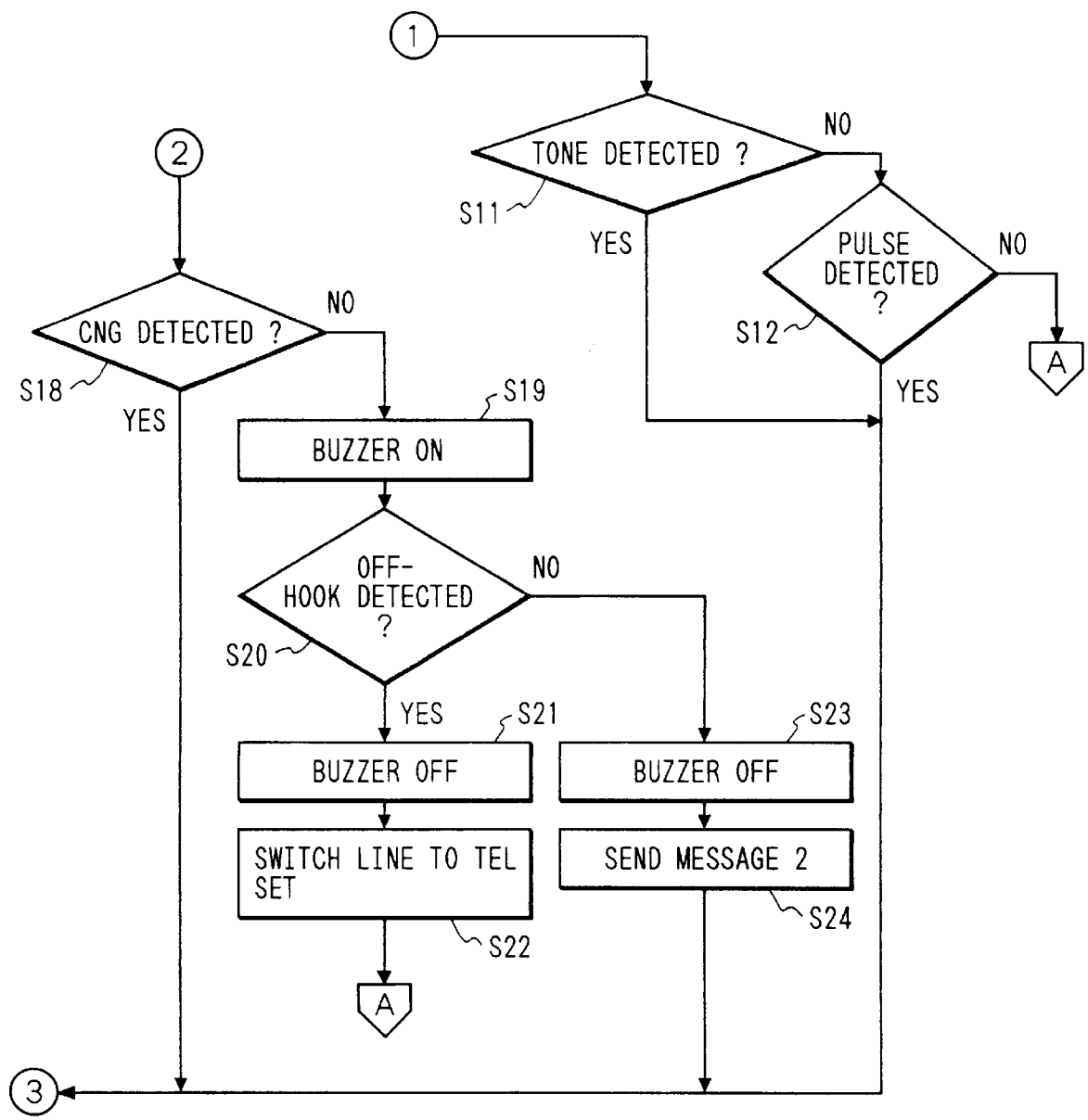

FACSIMILE APPARATUS WITH CHANGEABLE TRANSMISSION ENERGY LEVEL AND TRANSMISSION SPEED

This application is a continuation of application Ser. No. 08/091,600 filed Jul. 15, 1993.

BACKGROUND OF THE INVENTION

1. Field of the Invention

The present invention relates to a portable or stationary facsimile apparatus.

2. Related Background Art

In a prior art facsimile apparatus, change from 9600 bps to 4800 bps, for example, is conducted by continuously depressing a start key for longer than a predetermined time.

In the prior art apparatus, when the dimension of the apparatus is reduced to permit portability, a user frequently connects the facsimile apparatus to one of a plurality of different lines instead of to a fixed station line. If the user cannot change a transmission level when the facsimile apparatus is connected to one of those different lines, facsimile communication is not attained.

No proposal to solve the above problem has been made yet.

SUMMARY OF THE INVENTION

It is an object of the present invention to improve a facsimile apparatus in light of the above.

It is another object of the present invention to provide a facsimile apparatus which permits communication on a line remote from a fixed station line by enhancing a transmission level when a start key is continuously depressed for longer than a predetermined time.

It is other object of the present invention to provide a facsimile apparatus which can change the transmission level depending on whether the line is connected to a cellular, a coupler or a subscriber line.

BRIEF DESCRIPTION OF THE DRAWINGS

FIG. 5 is comprised of FIGS. 5A and 5B showing operation in the embodiment;

DETAILED DESCRIPTION OF THE PREFERRED EMBODIMENTS

Figure 1:
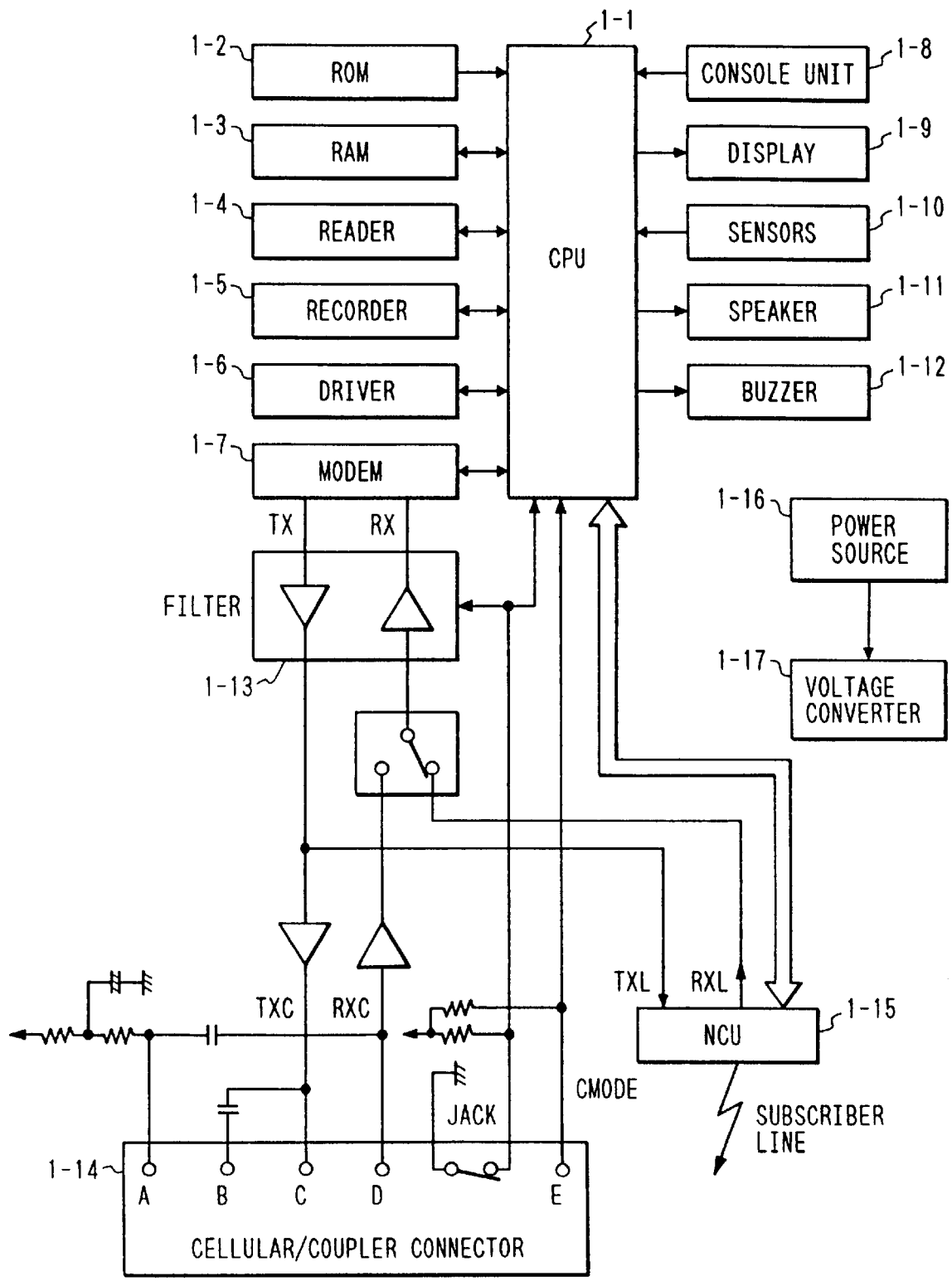
FIG. 1 shows a block diagram of a configuration of a main unit of a portable facsimile apparatus in accordance with an embodiment of the present invention.

FIGS. 1, 2, 3, 4, 5A, 5B, 6, 7, 8, 9A, 9B, 9C, 10, 11A, 11B and 11C best show features of the present invention. FIG. 1 shows a block diagram of a main unit of the present invention. CPU 1—1 controls the entire facsimile apparatus, that is, a RAM 1–3, a reader 1–4, a recorder 1–5, a driver 1–6, a modem 1–7, a console unit 1–8, a display 1–9, a sensor 1–10, a speaker 1–11, a buzzer 1–12, a filter 1–13, a cellular/coupler connector 1–14 and an NCU 1–15, under control of a program stored in a ROM 1–2.

Those units are explained below.

The RAM 1–3 stores binary image data read by the reader 1–4 or binary data to be recorded by the recorder 1–5, stores a signal modulated by the modem 1–7, and stores binary data outputted from a subscriber line through the NCU 1–15. The RAM 1–3 is further used to demodulate an analog waveform inputted from the subscriber line through the NCU 1–15 and the modem 1–7 and stores the resulting binary data.

The reader 1–4 comprises a DMA controller, a CCD or a close contact type image sensor (CS), a TTL IC and a binary circuit. It binarizes the data read by using the CCD or the CS under the control of the CPU 1—1 and sends the binary data to the RAM 1–3.

The recorder 1–5 comprises a DMA controller, a B4/A4 size thermal head and a TTL IC. It reads the binary data stored in the RAM 1–3 under the control of the CPU 1—1 and prints it out as a hard copy.

The driver 1–6 comprises a stepping motor for driving feed and eject rollers of the reader 1–4 and the recorder 1–5, a gear for transmitting a driving force of the motor, and a driver circuit for controlling the motor.

The modem 1–7 comprises G3, G2, G1 and old FM modems and clock generators connected to the modems. It modulates transmission data stored in the RAM 1–3 under the control of the CPU 1—1 and conducts communication by an analog signal from the subscriber line through NCU 1–15 or from the cellular/coupler connector 1–14.

The modem 1–7 further receives the analog signal from the subscriber line or from the cellular/coupler connector 1–14 and the NCU 1–15, and demodulates and binarizes it and stores the binary data in the RAM 1–3.

The console unit 1–8 comprises a start key for transmission and reception, a mode key for designating an operation mode such as fine mode and standard mode in the transmitted image, a copy key for a copy operation, an economy key for designating an energy saving mode in recording and printing when a battery power supply is used, and a stop key for stopping the operation.

The CPU 1—1 detects the depression of those keys and controls the respective units in accordance with the depression status.

The display 1–9 displays an operation status such as a communication status, a power supply status and the fine and standard modes. It comprises an LCD or LED's.

The sensor 1–10 comprises a record sheet width sensor, a record sheet presence/absence sensor, a document sheet width sensor and a document sheet presence/absence sensor. It detects the status of the document sheet and the record sheet under the control of the CPU 1—1.

The speaker 1–11 comprises a speaker and a speaker driver. It monitors a voice signal and a communication signal under the control of the CPU.

The buzzer 1–12 comprises a buzzer and a buzzer driver. It generates an alarm sound and a key touch sound under the control of the CPU.

The filter 1–13 is a low-pass filter which comprises an operational amplifier.

The cellular/coupler control unit 1–14 comprises a connector with a switch and it is an analog signal interface for connecting a mobile communication terminal and an acoustic coupler.

Signals are:

Cellular TX signal (C): a transmission signal supplied from the main unit to the mobile terminal;

Cellular RX signal (D): a reception signal supplied from the mobile terminal to the main unit;

Coupler RX signal (A): a transmission signal from the main body to the acoustic coupler;

Coupler RX signal (B): a reception signal from the acoustic coupler to the main unit;

JACK signal indicates to the CPU whether a plug is connected or not by a switch of the cellular/coupler connector.

Figure 2:
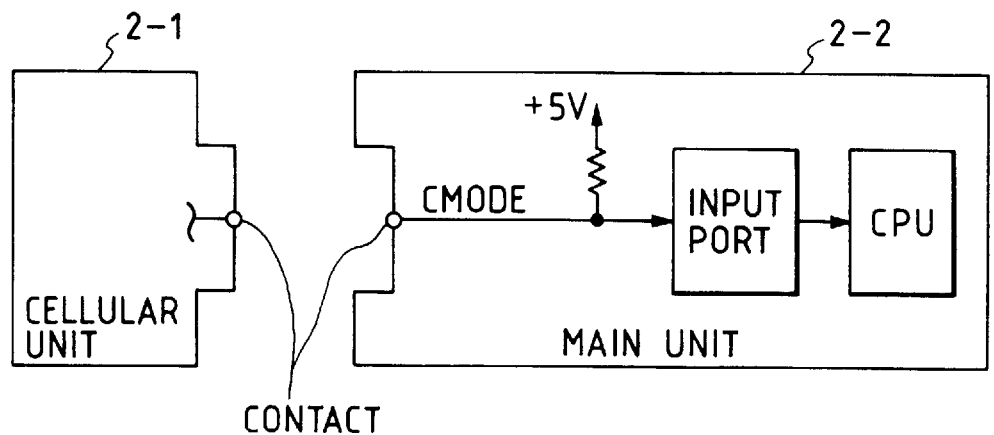
FIG. 2 shows a CMODE signal when the facsimile apparatus is connected to a mobile terminal.

CMODE signal is high when the cellular is connected by the cellular/coupler connector as shown in FIG. 2.

Figure 3:
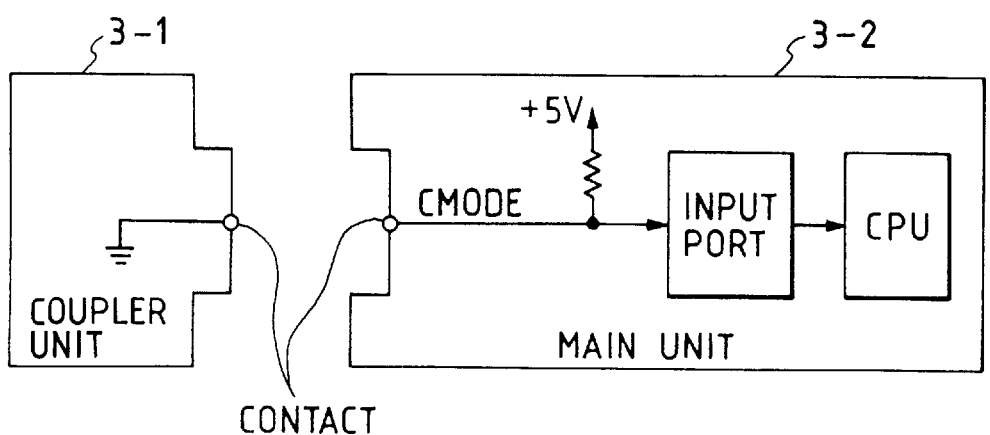
FIG. 3 shows the CMODE signal when the facsimile apparatus is connected to an acoustic coupler.

CMODE signal is low when the coupler is connected by the cellular/coupler connector as shown in FIG. 3.

Whether a plug is inserted in the jack terminal or not is indicated by the JACK signal to the CPU, and the transmission level is changed in accordance with the communication mode such as the cellular connection mode, the coupler connection mode or the subscriber line connection mode, and the reception signal is selected depending on the cellular connection mode, the coupler connection mode or the subscriber line connection mode.

The communication speed is set to 4800 bps in the cellular/coupler connection mode and 9600 bps in the subscriber line connection mode.

By sending the CMODE signal of the cellular/coupler connection to the CPU, whether it is the mobile terminal or the acoustic coupler can be determined and the transmission level which fits thereto is sent out and the reception level which fits thereto is selected.

An NCU 1–15 captures the subscriber line by a line capture relay, DC capture, 2-to-4 wire conversion, and control by the CPU 1—1.

A power supply 1–16 supplies powers to the respective units. It supplies a DC voltage of +12 volts by one of three configurations shown in FIGS. 11A to 11C.

Figure 11A:
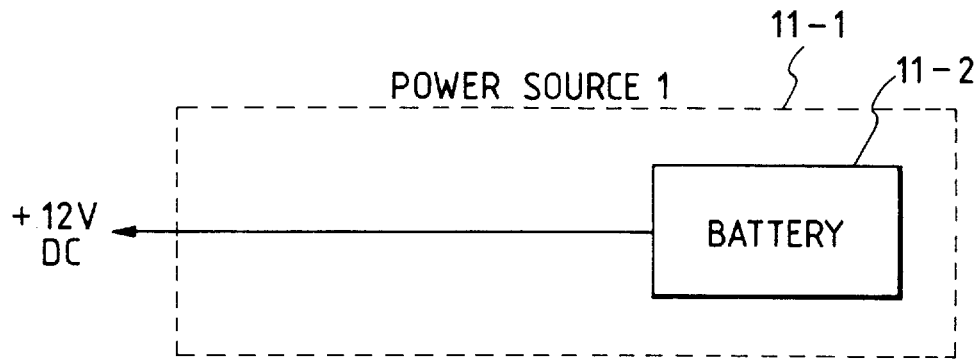
FIGS. 11A to 11C show block diagrams of a configuration of a power supply.

A power supply 11–1 shown in FIG. 11A comprises a battery 11–2 of DC +12 volts and supplies a voltage of DC +12 volts to the respective unit of the main unit.

Figure 11B:
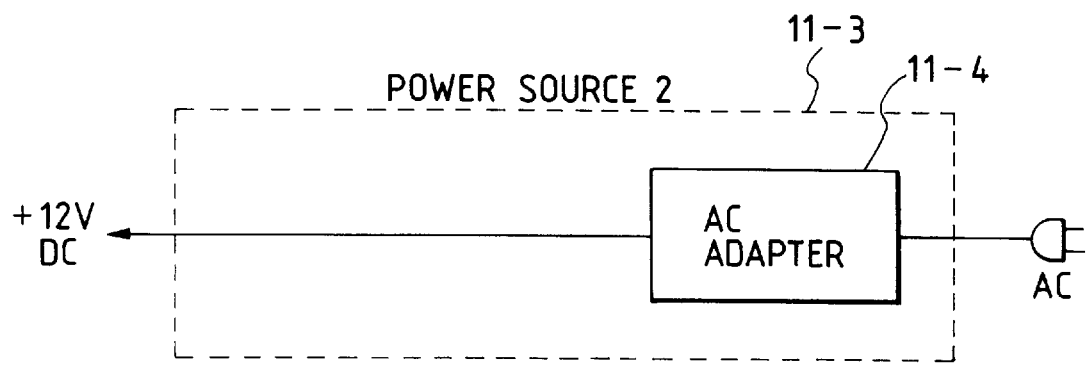

A power supply 11–3 shown in FIG. 11B comprises an AC adaptor 11–4 for converting an AC power input to DC +12 volts. It supplies powers of DC +12 volts to the respective units of the main unit.

Figure 11C:
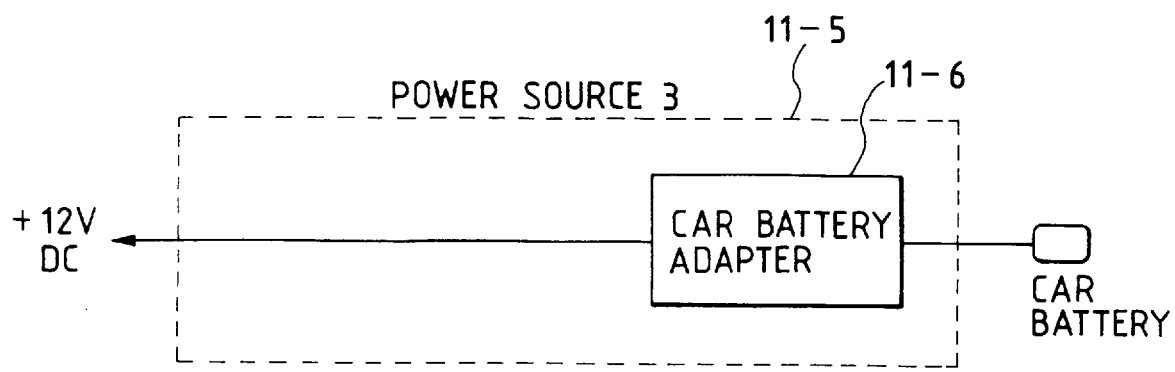

A power supply 11–5 shown in FIG. 11C comprises a car battery adaptor 11–6 which converts a DC power from a car mounted battery. It supplies powers of DC +12 volts to the respective units of the main body.

A voltage converter 1–17 comprises a series regulator, a switching regulator and a DC/DC converter. It converts the DC +12 volts supplied from the power supply 1–16 to DC +5 volts.

FIG. 2 shows a block diagram when the main unit of the present invention is connected to the mobile terminal. When the mobile terminal 2–1 is connected to the portable facsimile 2—2, the CMODE signal is open in the cellular unit so that the CMODE signal applied to the CPU 1—1 of the main unit is high.

FIG. 3 shows a block diagram when the main unit of the present invention is connected to the acoustic coupler. When the acoustic coupler 3–1 is connected to the portable facsimile 3–2, the CMODE signal is connected to GND in the coupler so that the CMODE signal applied to the CPU 1—1 is low.

Figure 4:
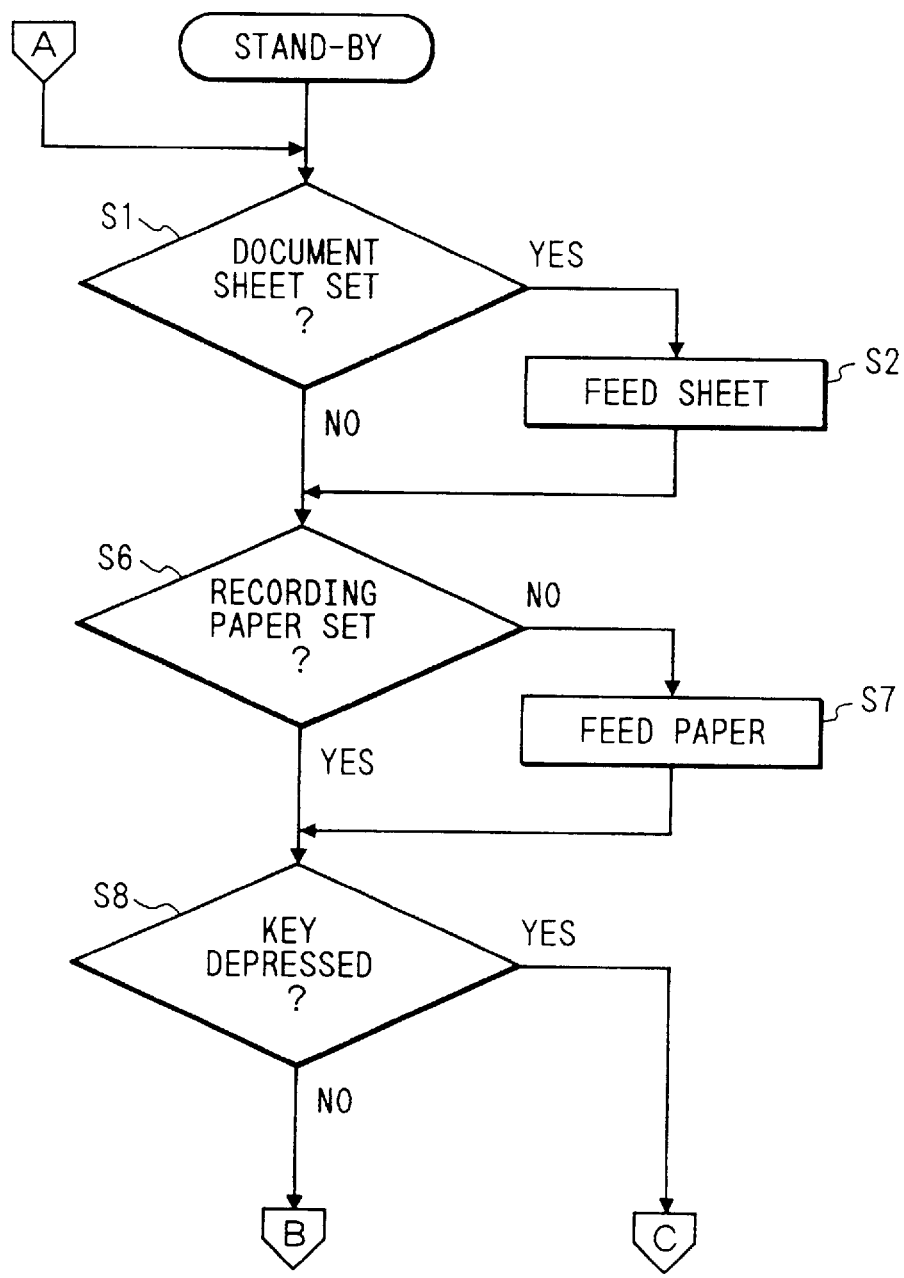
FIG. 4 shows a flow chart of a facsimile operation in the embodiment.

An operation in the above configuration is explained with reference to flow charts of FIGS. 4–6.

After the power-on, a standby mode is started. In a step S1, the loading of a document sheet is determined by checking the presence or absence of the document sheet. If the document sheet has been loaded, the document sheet is fed in a step S2 and the process proceeds to a step S6.

If the document sheet has not been loaded, the process proceeds to the step S6.

In the step S6, the loading of a record sheet is determined by checking the presence or absence of the record sheet, and if the record sheet has not been set, the record sheet is fed in a step S7 and the process proceeds to a step S8.

If the record sheet has been set, the process proceeds to the step S8.

Figure 6:
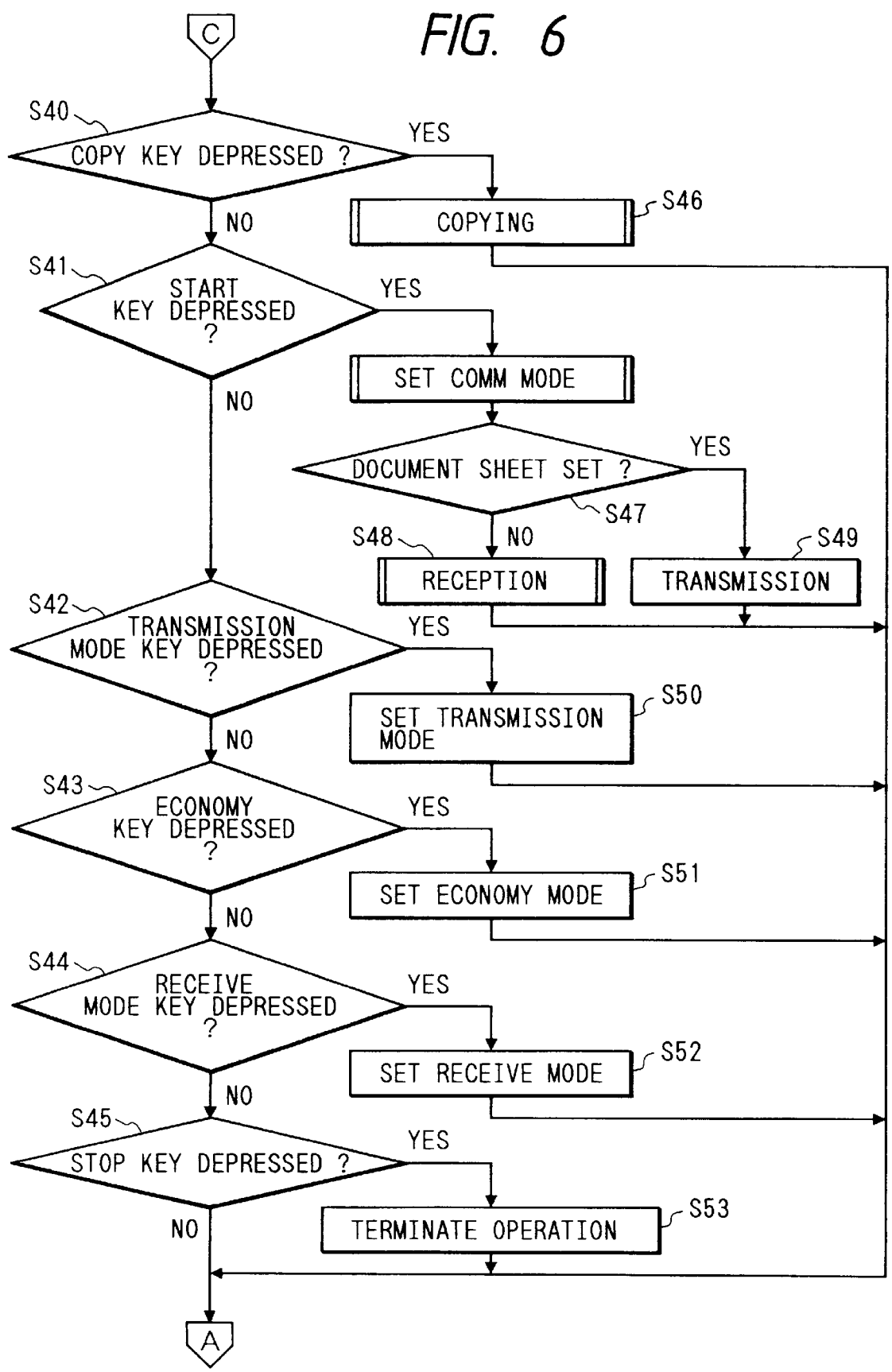
FIG. 6 shows a flow chart of a facsimile operation in the embodiment.

In the step S8, whether any key of the console unit 1–8 has been depressed or not is determined, and if one has been depressed, a key operation of a flow C FIG. 6 is started.

If none of the keys has been depressed, a flow B (FIG. 5) is started. The mode switch is in a manual mode or not is determined in a step S5, and if it is in the manual mode, a tone signal or a pulse signal sent to switch from the telephone set to the facsimile apparatus is detected in steps S11 and S12. The tone signal is detected by a modem and the pulse signal is detected by the CPU by the OFF–HOOK signal of the NCU.

If none of the signals is detected, the process returns to the stand-by status, and if any signal is detected, a CML relay of the NCU is switched from the externally connected telephone to the facsimile apparatus through the contact by the CML signal from the CPU of the main unit, and the process proceeds to the reception mode of the step S27.

In the step S5, if the mode switch is not in the manual mode, whether the mode switch is in a FAX/TEL automatic switching mode or not in a step S9, and if it is in the FAX/TEL automatic switching mode, a CI signal is detected by a CI signal from a CI detector of the NCU by the CPU in a step S13. If the CI signal is not detected, the process returns to the stand-by status, and if it is detected, a voice message 1 "Now calling. Please wait for a while." is sent from the modem 1–7 through TX of the NCU in a step S14, and in a step S15, a busy tone signal BT is detected by the modem of the main unit. When the BT signal is detected, the line is released in a step S16 and the process returns to the stand-by status. If it is not detected, a CNG signal at 1100 Hz is detected or an FC signal is detected. If any of the signals is detected, the reception mode of the step S27 is started, and if none of the signals is detected, a buzzer sound is generated in a step S19 to inform that the destination is a telephone set.

After the buzzer sound has been generated, an OFF-HOOK signal is detected to determine whether the handset has been hooked off or not in a step S20. If it is detected, the buzzer sound is stopped in a step S21, and in a step S22, the line is switched to a subtelephone and the process returns to the stand-by mode.

If the OFF-HOOK signal is not detected, the buzzer sound is stopped in a step S23 and, in a step S24, a voice message 2 "CALLED BUT NO ONE WAS AROUND THERE. IF YOU ARE ON A FACSIMILE APPARATUS, PLEASE SEND." and the step S27 is started.

In the step S9, if the mode switch is not in the FAX/TEL automatic switching mode, whether the mode switch is in an automatic responding and recording telephone connection mode or not is determined in a step S10, and if it is not, the process returns to the stand-by mode. If it is in the automatic responding and answering telephone connection mode, the CNG signal is detected in a step S25. If it is detected, the process returns to the reception mode of the step S27.

If the CNG signal is not detected, whether the destination is soundless or not is determined in a step S26 and if it is soundless, the reception mode of the step S27 is started. If it is not soundless, the process returns to the stand-by status.

Flow C is now explained with reference to FIG. 6.

In a step S40, whether a copy key has been depressed or not is determined, and if it has been depressed, a copy mode is started in a step S46.

If the copy key has not been depressed, whether a start key has been depressed or not is determined in a step S41.

Figure 7:
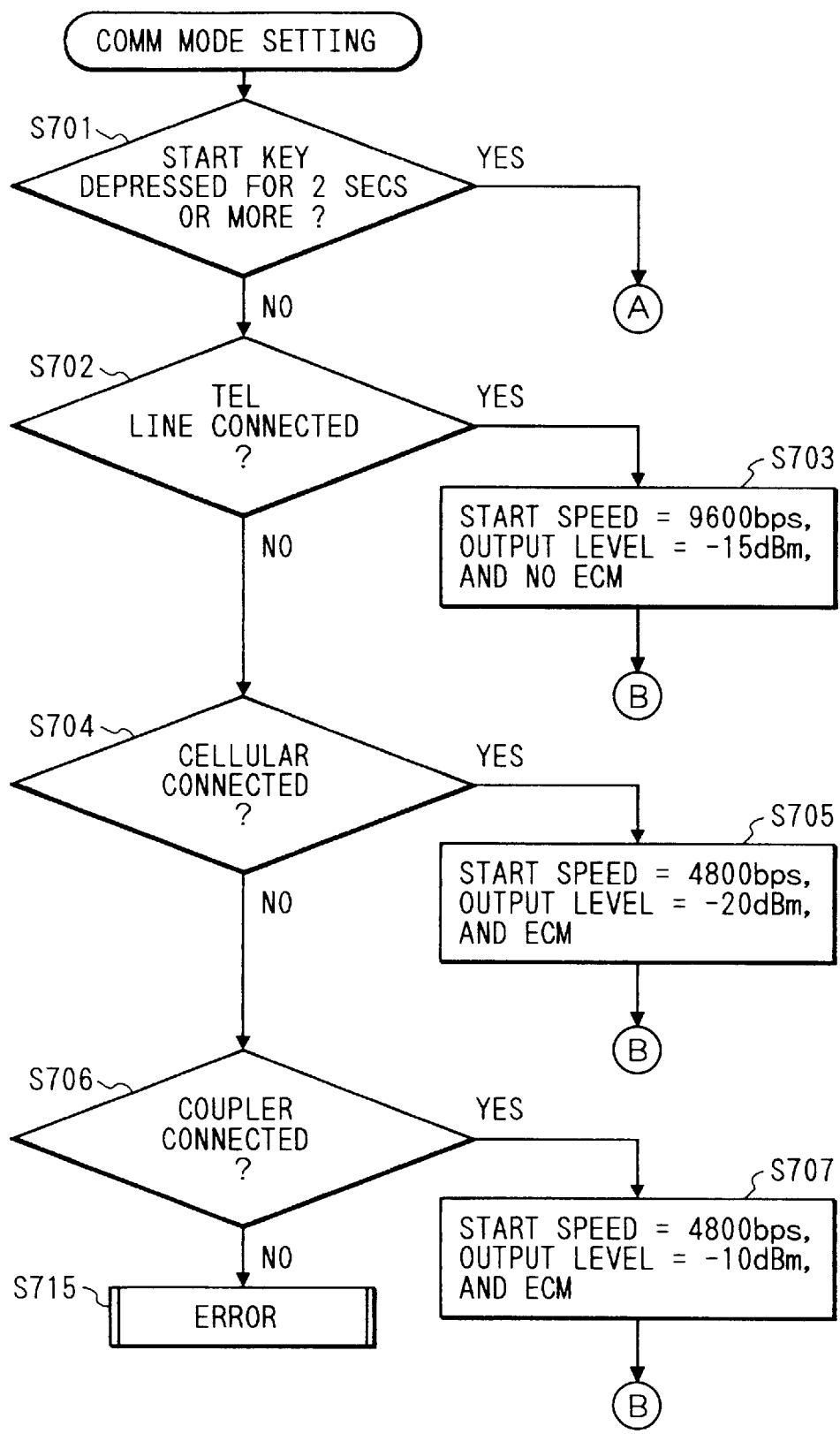
FIG. 7 shows a flow chart of a communication mode set operation in the embodiment.
Figure 8:
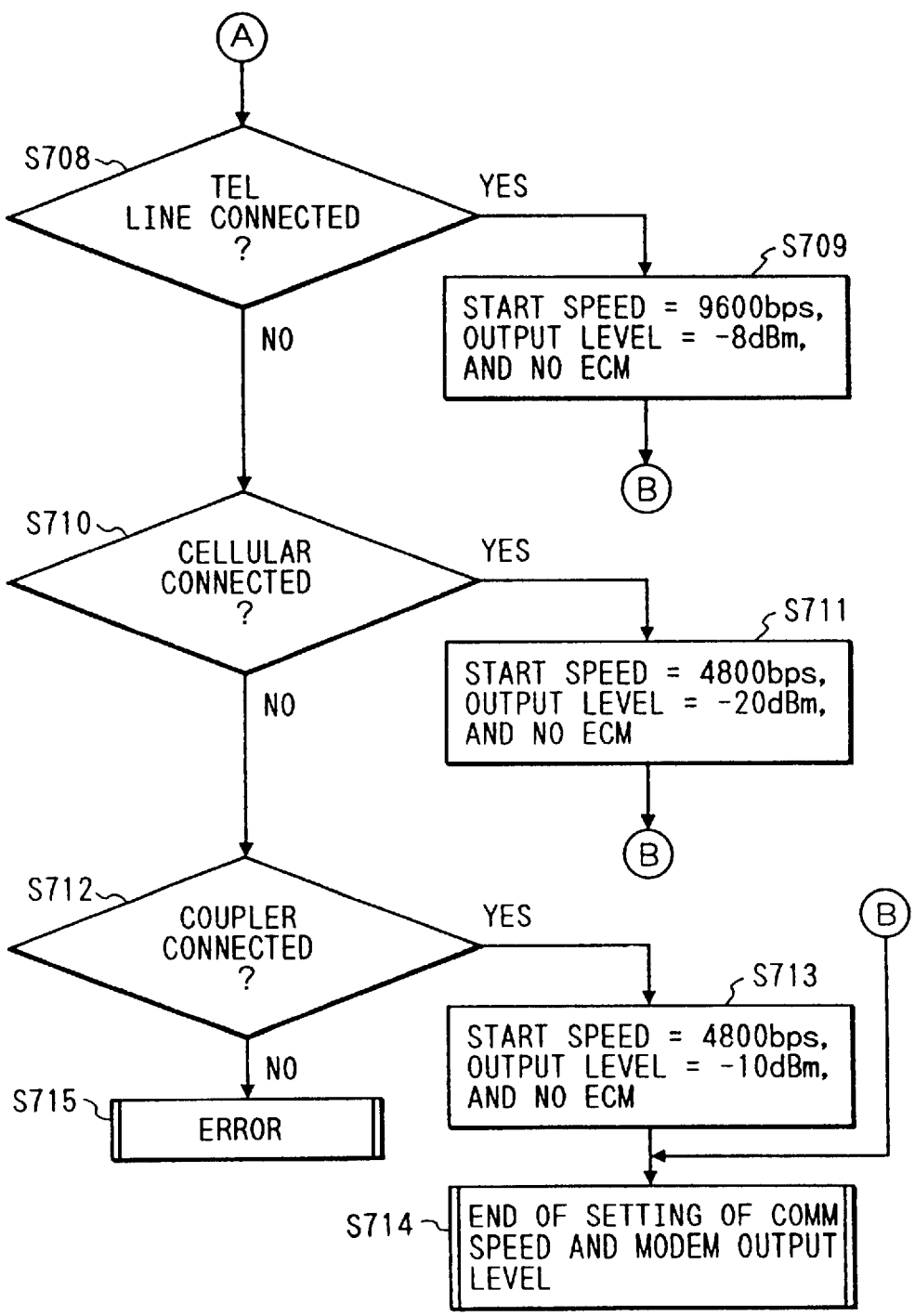
FIG. 8 shows a flow chart of a communication mode set operation in the embodiment.

If the start key has been depressed, a communication mode which will be explained in detail hereinlater with reference to FIGS. 7 and 8 is set, and in a step S47, the presence or absence of a transmission document sheet is determined. If the document sheet is present, the same operation as that of the prior art facsimile manual transmission is conducted in a step S49.

If the document sheet is not present, the reception mode is started in a step S48.

In step S41, if the start key has not been depressed, whether a transmission mode key has been depressed or not is determined in a step S42, and if it has been depressed, the transmission mode is set to either fine or standard in a step S50.

If the transmission mode key has not been depressed, whether an economy key has been depressed or not is determined in a step S43. If it has been depressed, an economy mode in which intermittent printing is conducted is set in a step S51.

If the economy key has not been depressed, whether a reception mode key has been depressed or not is determined in a step S44. If it has been depressed, the reception mode is set to one of a manual mode, a FAX/TEL switching mode and an automatic responding and recording telephone connection mode in a step S52 and the selected mode is displayed by the LED on the display.

If the reception mode key has not been depressed, whether a stop key has been depressed or not is determined in a step S45. If it has been depressed, the operation is immediately stopped in a step S53 and the process returns to the stand-by status.

If the stop key has not been depressed, that is, if none of the keys has been depressed, the process returns to the stand-by status.

An operation in setting the communication mode in the present embodiment is now explained with reference to a flow chart of FIG. 7.

If the start key has been depressed in the step S41 of the flow chart of FIG. 6, the communication mode is set before the transmission and the reception.

If the start key is depressed continuously for longer than two seconds in a step S701, a signal to inform such is output to an operator from the buzzer two seconds after the start of the depression.

When the start key is not depressed for two seconds:
If the telephone line is connected to the modular jack (JACK=low) in a step S702, a communication start speed is set to 9600 bps and the modem transmission level is set to −15 dbm in a step S703, without error correcting mode ("ECM").

If the cellular phone connection cable is connected to the main unit (JACK=high, CMODE=high) in a step S704, the communication start speed is set to 4800 bps and the modem transmission level is set to −20 dbm in a step S705, with ECM.

If the acoustic coupler is connected to the main unit (JACK=high, CMODE=low) in a step S706, the communication start speed is set to 4800 bps and the modem transmission level is set to −10 dbm in a step S707, with ECM.

When the start key is depressed for longer than two seconds:
If the telephone line is connected to the modular jack in a step S708, the communication start speed is set to 9600 bps and the modem transmission level is set to −8 dbm in a step S709, without ECM.

If the cellular phone connection cable is connected to the main unit in a step S710, the communication start speed is set to 4800 bps and the modem transmission level is set to −20 dbm in a step S711, without ECM.

If the acoustic coupler is connected to the main unit in a step S712, the communication start speed is set to 4800 bps and the modem transmission level is set to −10 dbm in a step S713, without ECM. The process is terminated in a step S714.

If none of the lines is connected, an error is displayed in a step S715 and the process returns to the stand-by status.

Figure 9A:
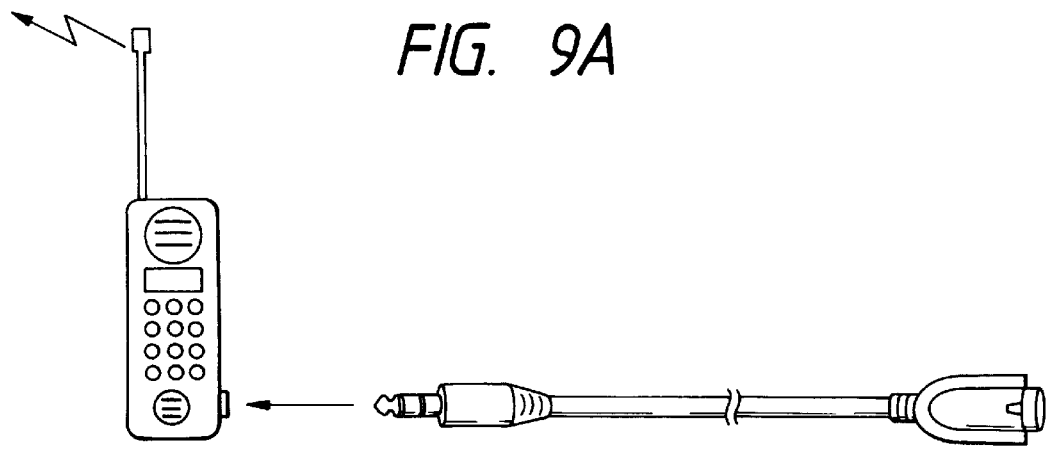
FIGS. 9A to 9C show outer views when the embodiment is connected to a mobile terminal or an acoustic coupler.
Figure 9B:
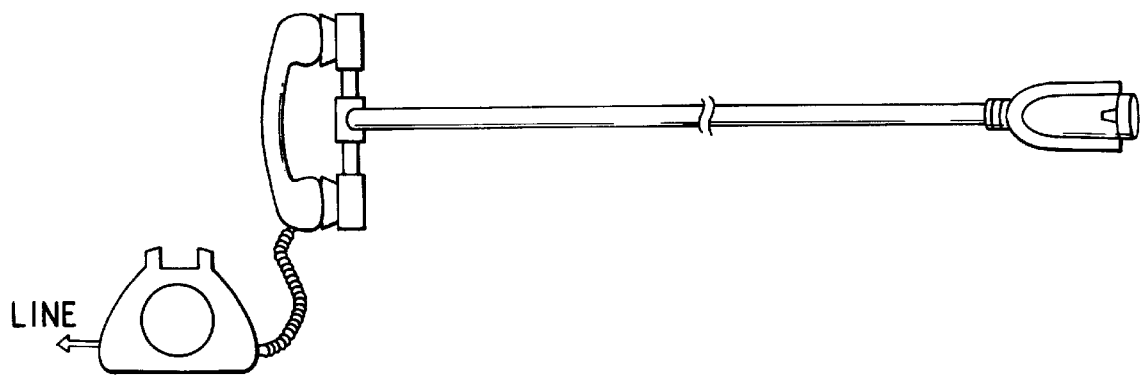
Figure 9C:
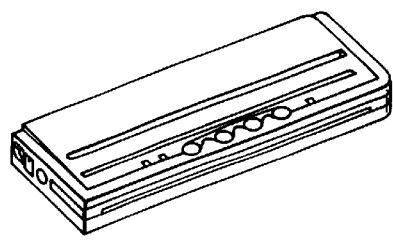

FIGS. 9A to 9C show an outer view of the present invention. FIG. 9C shows the main unit of the portable facsimile apparatus which is configured as shown in the block diagram of FIG. 1.

FIG. 9A shows a view when the mobile terminal is connected to the main unit of the portable facsimile apparatus and it is configured as shown by the block diagram of FIG. 2.

FIG. 9B shows a view when the acoustic coupler is connected to the main unit of the portable facsimile apparatus and it is configured as shown by the block diagram of FIG. 3.

Figure 10:
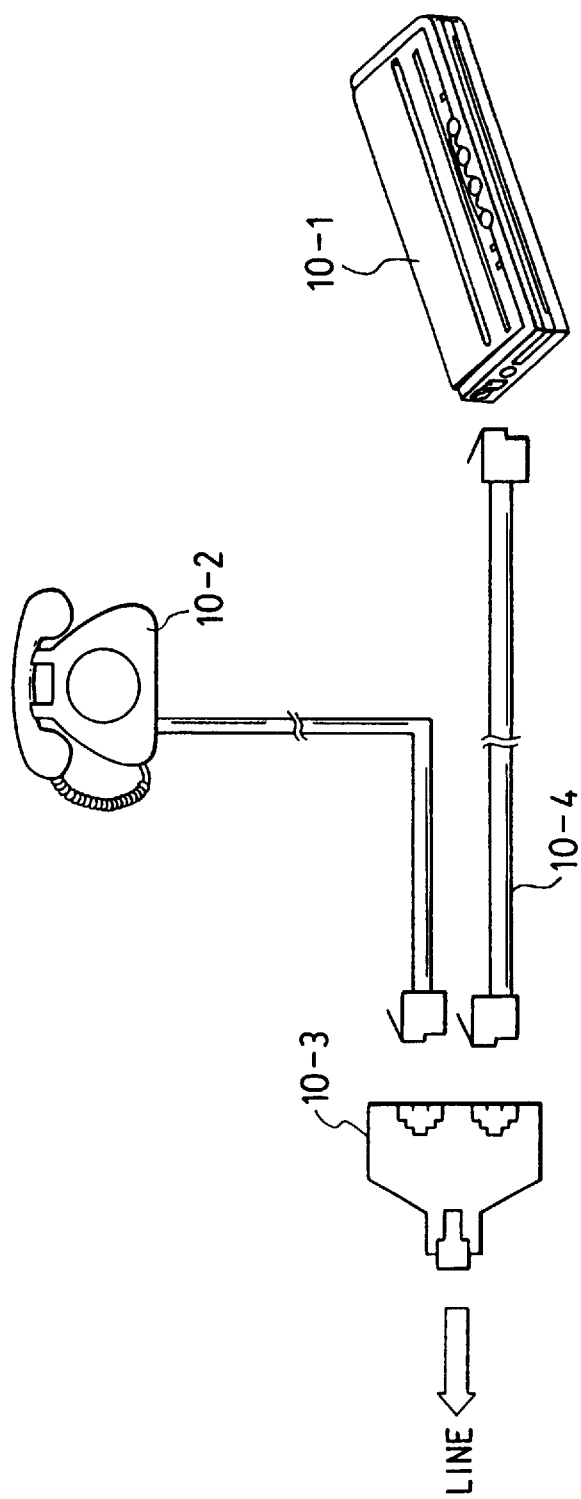
FIG. 10 shows an outer view when the embodiment is connected to a subscriber line.

FIG. 10 shows an outer views of the present invention. It shows a view when the subscriber line 10–4 is connected to the portable facsimile main unit 10–1. The portable facsimile apparatus 10–1 is connected to the sub–telephone set 10–2 by using a parallel connector 10–3.

<Other Embodiment>

Figure 12:
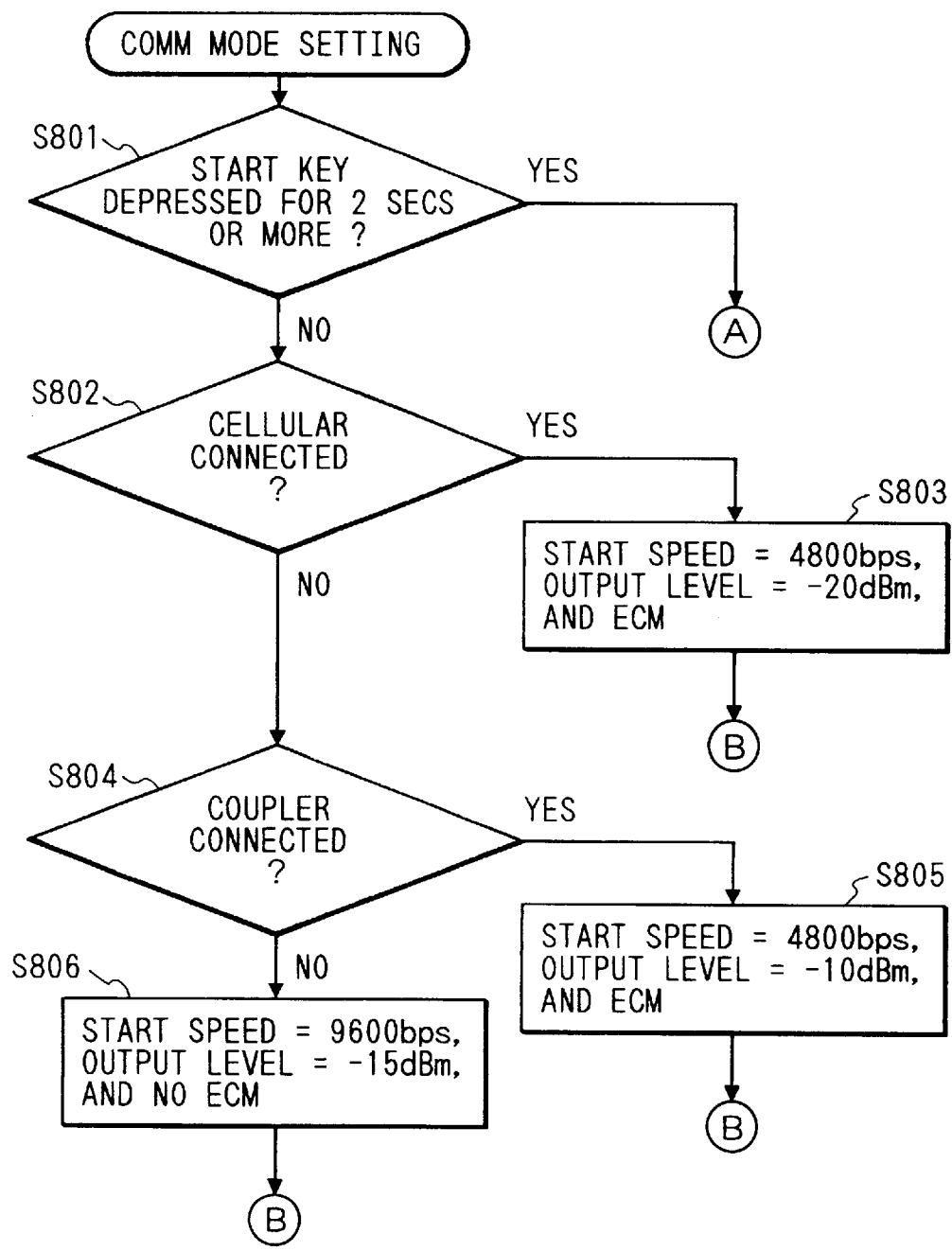
FIG. 12 shows a flow chart of the communication mode set operation in another embodiment.
Figure 13:
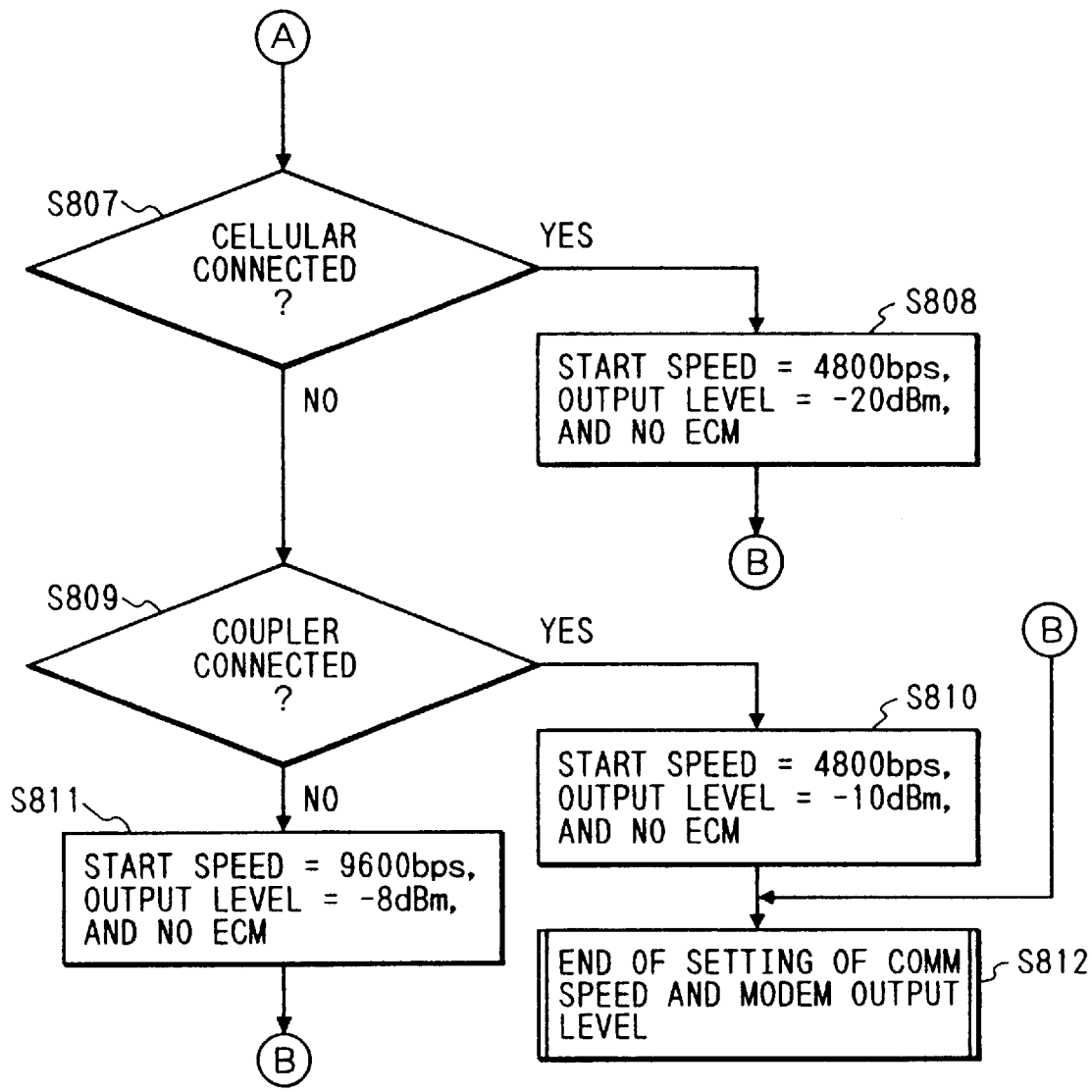
FIG. 13 shows a flow chart of the communication mode set operation in other embodiment.

An operation for setting the communication mode in another embodiment is now explained with reference to FIGS. 12 and 13.

If the start key has been depressed in the step S41 of the flow chart of FIG. 6, the communication mode is set before the transmission and the reception.

In a step S801, if the start key is depressed continuously for longer than two seconds, a signal to inform the two-second depression from the buzzer of the main unit to an operator is outputted two seconds after the start of the depression.

When the start key is not depressed for two seconds:
If the cellular phone connection cable is connected to the main unit in a step S802, the communication start speed is set to 4800 bps and the modem transmission level is set to −20 dbm in a step S803, with ECM.

If the acoustic coupler is connected to the main unit in a step S804, the communication start speed is set to 4800 bps and the modem transmission level is set to −10 dbm in a step S805, with ECM.

If none of them is connected, it is assumed that the telephone line is connected to the modular jack and the communication start speed is set to 9600 bps and the modem transmission level is set to −15 dbm in a step S806, without ECM.

When the start key is depressed for longer than two seconds:

If the cellular phone connection cable is connected to the main unit in a step S807, the communication start speed is set to 4800 bps and the modem transmission level is set to −20 dbm in a step S808, without ECM.

If the acoustic coupler is connected to the main unit in a step S809, the communication start speed is set to 4800 bps and the modem transmission level is set to −10 dbm in a step S810, without ECM.

If none of them is connected, it is assumed that the telephone line is connected to the modular jack and the communication start speed is set to 9600 bps and the modem transmission level is set to −8 dbm in a step S811, without ECM.

Then, in a step S812, this process is terminated.

As described above, the transmission level is changed when the start key is depressed continuously for longer than two seconds so that the communication is attained even if the portable facsimile apparatus is connected to a line remote from a fixed station line.

What is claimed is:

1. A facsimile apparatus comprising:

communication means for communicating data through a communication line;

changing means for changing a transmission energy level of a signal transmitted by said communication means to the line, wherein said changing means changes the transmission energy level by a manual instruction; and a start key for instructing the start of the communication to said communication means, said changing means changing the transmission energy level in accordance with the depression duration of the start key.

2. A facsimile apparatus according to claim 1, wherein said changing means changes the communication speed of said communication means in accordance with the changed transmission energy level.

3. A facsimile apparatus comprising:

communication means for communicating data through a communication line;

connection means connected to said communication means and connectable to any of a plurality of different types of communication lines;

changing means for changing a transmission energy level of a data signal transmitted by said communication means to a connected communication line; and discrimination means for discriminating, in response to a signal from said connection means, a type of the communication line connected to said connection means, said changing means changing the transmission energy level in accordance with the type of the communication line discriminated by said discrimination means.

4. A facsimile apparatus according to claim 3, wherein said changing means changes the communication speed of said communication means in accordance with the changed transmission energy level.

5. A facsimile apparatus comprising:

communication means for communicating data through a communication line;

connection means connected to said communication means and connectable to any of a plurality of different types of communication lines;

changing means for changing a transmission speed of a signal transmitted by said communication means to a connected communication line; and discrimination repairs for discriminating, in response to a signal from said connection means, a type of the communication line connected to said connection means, said changing means changing the transmission speed in accordance with the type of the communication line discriminated by said discrimination means.

6. A facsimile apparatus comprising:

communication means for communicating data through a communication line;

connection means connected to said communication means and connectable to any one of plural types of communication lines, one of the communication lines being a wireless communication circuit;

changing means for changing a transmission speed of a signal transmitted by said communication means to a connected communication line;

discrimination means for discriminating, in response to a signal from said connection means, a type of the communication line connected to said connection means, said changing means changing the transmission speed in accordance with the type of the communication line discriminated by said discrimination means, wherein said discrimination means discriminates whether the connected communication line is the wireless communication circuit.

7. A facsimile apparatus comprising:

communication means for communicating data through a communication line;

connection means connected to said communication means and connectable to any one of plural types of communication lines, one of the communication lines including an acoustic coupler;

changing means for changing a transmission speed of a signal transmitted by said communication means to a connected communication line;

discrimination means for discriminating, in response to a signal from said connection means, a type of the communication line connected to said connection means, said changing means changing the transmission speed in accordance with the type of the communication line discriminated by said discrimination means, wherein said discrimination means discriminates whether the connected communication line includes the acoustic coupler.

8. A facsimile communication method comprising the steps of:

changing a transmission energy level of a facsimile communication signal;

conducting facsimile transmission at the changed transmission energy level; and depressing a start key to instruct start of facsimile communication, wherein said changing step changes the transmission energy level in accordance with depression duration of the start key.

9. A facsimile communication method according to claim 8, wherein in said changing step the communication speed of facsimile transmission is also changed in accordance with the changed transmission energy level.

10. A facsimile communication method comprising the steps of:

changing a transmission energy level of a facsimile communication signal;

conducting facsimile transmission at the changed transmission energy level by a facsimile communication apparatus connectable to any one of a plurality of different types of communication lines; and discriminating a type of a communication line connected to the facsimile communication apparatus, wherein in said changing step the transmission energy level is changed in accordance with the type of the communication line discriminated in said discrimination step.

11. A facsimile communication method according to claim 10, wherein in said changing step the communication speed of said communication apparatus is changed in accordance with the changed transmission energy level.

12. A facsimile communication method comprising the steps of:

connecting one of a plurality of different types of communication lines to a facsimile communication apparatus using a connection device;

discriminating, in response of signal from the connection device, a type of the communication line connected in said connecting step;

changing a transmission speed of a facsimile transmission signal in accordance with the type of the communication line discriminated in said discriminating step; and conducting Facsimile communication at the changed transmission speed.

13. A facsimile communication method comprising the steps of:

connecting one of a plurality of different types of communication lines to a facsimile communication apparatus using a connection device, one of the communication lines being a wireless communication circuit;

discriminating, in response to a signal from the communication device, a type of the communication line connected n said connecting step;

changing a transmission speed of a facsimile transmission signal in accordance with the type of communication line discriminated in said discriminating step; and conducting facsimile communication at the changed transmission speed, wherein said discrimination step discriminates whether connection is to the wireless communication circuit.

14. A facsimile communication method comprising the steps of:

connecting one of a plurality of different types of communication lines to a facsimile communication apparatus using a connection device, one of the communication lines including an acoustic coupler;

discriminating, in response to a signal from the connection device, a type of the communication line connected in said connecting step;

changing a transmission speed of a facsimile transmission signal in accordance with the type of communication line discriminated in said discriminating step; and conducting facsimile communication at the changed transmission speed, wherein said discrimination step discriminates whether connection is to the communication line including the acoustic coupler.

15. A facsimile apparatus comprising:

communication means for communicating data through a communication line;

adapter means connected to said communication means and connectable to any of a plurality of different types of communication lines;

changing means for changing a transmission energy level of a data signal transmitted by said communication means to a connected one of the communication lines connected to the adapter means; and discrimination means for discriminating, in response to a signal from said adapter means, a connection condition of the one communication line to which said adapter means is connected, said changing means changing the transmission energy level in accordance with the connection condition of the one communication line discriminated by said discrimination means.

16. An apparatus according to claim 15, wherein said discrimination means discriminates whether the one communication line is a wireless communication circuit.

17. An apparatus according to claim 15, wherein said discrimination means discriminates whether the one communication line includes an acoustic coupler.

18. A facsimile apparatus comprising:

communication means for communicating data through a communication line;

adapter means connected to said communication means and connectable to any of a plurality of different types of communication lines;

changing means for changing a transmission speed of a signal transmitted by said communication means to a connected one of the communication lines connected to said adapter means; and discrimination means for discriminating, in response to a signal from said adapter means, a connection condition of the one communication line to which said adapter means is connected, said changing means changing the transmission speed in accordance with the connection condition of the one communication line discriminated by said discrimination means.

19. An apparatus according to claim 18, wherein said discrimination means discriminates whether the one communication line is a wireless communication circuit.

20. An apparatus according to claim 18, wherein said discrimination means discriminates whether the one communication line includes an acoustic coupler.

21. A method or operating a facsimile apparatus comprising the steps of:

communicating data through a communication line using a communication unit and an adapter unit connected to the communication unit and connectable to any of a plurality of different types of communication lines;

changing a transmission energy level of a data signal transmitted by said communication step to a connected one of the communication lines connected to the adapter unit; and discriminating, in response to a signal from the adapter unit, a connection condition of the one communication line to which the adapter unit is connected, said changing step changing the transmission energy level in accordance with the connection condition of the communication line discriminated by said discrimination step.

22. A method according to claim 21, wherein said discrimination step discriminates whether the one communication line is a wireless communication circuit.

23. A method according to claim 21, wherein said discrimination step discriminates whether the one communication line includes an acoustic coupler.

24. A method of operating facsimile apparatus comprising the steps of:

communicating data through a communication line using a communication unit and an adapter unit connected to the communication unit and connectable to any of a plurality of different types of communication lines;

changing a transmission speed of a signal transmitted by said communication step to a connected one of the communication lines connected to the adapter unit; and discriminating, in response to a signal from the adapter unit, a connection condition of the one communication line to which the adapter unit is connected, said changing step changing the transmission speed in accordance with the connection condition of the communication line discriminated by said discrimination step.

25. A method according to claim 24, wherein said discrimination step discriminates whether the one communication line is a wireless communication circuit.

26. A method according to claim 24, wherein said discrimination step discriminates whether the one communication line includes an acoustic coupler.

* * * * *

UNITED STATES PATENT AND TRADEMARK OFFICE
CERTIFICATE OF CORRECTION

PATENT NO. : 5,815,288

DATED : September 29, 1998

INVENTOR(S): YOSUKE EZUMI ET AL.

It is certified that error appears in the above-identified patent and that said Letters Patent is hereby corrected as shown below:

ON COVER PAGE AT [56] REFERENCES CITED, FOREIGN PATENT DOCUMENTS

"2100524" should read --2-100524--;
"4355537" should read --4-355537--.

ON COVER PAGE AT [56] REFERENCES CITED, U.S. PATENT DOCUMENTS

In 4,932,048, "Kermochi et al." should read
  --Kenmochi et al.--.

ON COVER PAGE AT [73], ASSIGNEE

"Canon Kabushiki Kaisha, Japan" should read
  --Canon Kabushiki Kaisha, Tokyo, Japan--.

COLUMN 5

Line 3, "and" should read --from the modem 1-7 and the
  reception mode of--.

COLUMN 8

Line 10, "repairs" should read --means--.

UNITED STATES PATENT AND TRADEMARK OFFICE
CERTIFICATE OF CORRECTION

PATENT NO. : 5,815,288

DATED : September 29, 1998

INVENTOR(S): YOSUKE EZUMI ET AL.

It is certified that error appears in the above-identified patent and that said Letters Patent is hereby corrected as shown below:

COLUMN 9

Line 14, "lines;" should read --lines through a connection means;--;
Line 15, "discriminating" should read --discriminating, in response to a signal from the connection means,--;
Line 30, "of" should read --of a--;
Line 37, "Facsimile" should read --facsimile--;
Line 47, "n" should read --in--.

COLUMN 10

Line 54, "or" should read --of--.

Signed and Sealed this

Third Day of August, 1999

Attest:

Q. TODD DICKINSON

Attesting Officer

Acting Commissioner of Patents and Trademarks